United States Patent [19]

Hochreuter et al.

[11] 4,139,689
[45] Feb. 13, 1979

[54] POLYMERIC BASIC AMIDES

[75] Inventors: Richard Hochreuter, Oberwil; James R. Runyon, Therwil, both of Switzerland

[73] Assignee: Sandoz Ltd., Basel, Switzerland

[21] Appl. No.: 777,469

[22] Filed: Mar. 14, 1977

Related U.S. Application Data

[63] Continuation of Ser. No. 596,286, Jul. 16, 1975, abandoned, which is a continuation of Ser. No. 333,485, Feb. 20, 1973, abandoned.

[30] Foreign Application Priority Data

Feb. 24, 1972 [CH] Switzerland ............................ 2637/72

[51] Int. Cl.$^2$ ............................................. C08F 8/32
[52] U.S. Cl. ..................................... 526/52.4; 526/16; 526/22; 526/52.5; 526/58; 526/329; 526/352
[58] Field of Search .................... 526/49, 52.4, 52.5

[56] References Cited

U.S. PATENT DOCUMENTS

| | | | |
|---|---|---|---|
| 2,483,125 | 12/1969 | Clough | 252/51.5 |
| 3,171,830 | 3/1965 | Kehr | 526/49 |
| 3,293,112 | 12/1966 | Kehr | 526/49 |
| 3,415,750 | 12/1968 | Anzenberger | 260/309.6 |
| 3,445,386 | 5/1969 | Otto et al. | 260/309.6 |

FOREIGN PATENT DOCUMENTS

| | | | |
|---|---|---|---|
| 1021696 | 3/1966 | United Kingdom | 526/49 |
| 1070077 | 5/1967 | United Kingdom | 526/49 |

*Primary Examiner*—William F. Hamrock
*Attorney, Agent, or Firm*—Gerald D. Sharkin; Richard E. Vila; Thomas C. Doyle

[57] ABSTRACT

The invention concerns polymeric basic amides produced by reacting a polymer containing carboxyl groups and a polyamine which contains an alkyl or alkenyl radical of 11 to 22 carbon atoms, at least one ethylene or propylene radical and at least two nitrogen atoms, of which at least one forms a primary or secondary amino group, at a temperature over 100° C., which in the form of their acid salts are water-dispersible and useful textile softeners.

10 Claims, No Drawings

POLYMERIC BASIC AMIDES

This is a continuation of application Ser. No. 596,286, filed July 16, 1975, now abandoned, which in turn is a continuation of application Ser. No. 333,485, filed Feb. 20, 1973, now abandoned.

The present invention relates to polymeric amides substituted by amino groups.

The invention provides a polymeric basic amide produced by reacting a polymer containing carboxyl groups and a polyamine which contains an alkyl or alkenyl radical of 11 to 22 carbon atoms, at least one ethylene or propylene radical and at least two nitrogen atoms, of which at least one forms a primary or secondary amino group, at a temperature of 100° C. or above.

The invention also provides the water-dispersible salts of the polymeric basic amides which are preparable by reacting the amide with an acid.

The reaction of the polymer containing carboxyl groups and a polyamine is suitably carried out at 100° to 220° C., preferably at 160° to 190° C. The polyamine is suitably employed in a ratio of 0.4 to 2 mols, preferably 1 to 1.4 mols, per carboxyl group of the polymer. The two reactants are suitably heated together to form a melt and the water of reaction distilled off, and is preferably effected in an inert atmosphere until an acid number of 20 to 50, depending upon the starting polymer, is achieved. To aid distillation, an agent which upon evaporation forms an azeotropic mixture with water vapour, for example xylene, may be added to the reaction mixture.

An especially suitable polymer containing carboxyl groups is oxidized polyethylene. This may be obtained in conventional manner by oxidation of polyethylene synthesized by the low or high pressure polymerization process, for example by oxidation with atmospheric oxygen. The molecular weight normally ranges from about 700 to 7000, preferably 1500 to 6000 or more especially 1500 to 4000. The acid number should be in the region of 10 to 120, preferably from 15 to 80.

Also especially suitable as starting polymers containing carboxyl groups are copolymers of ethylene and an unsaturated aliphatic carboxylic acid, preferably an α-, β-unsaturated carboxylic acid with 3 to 8 carbon atoms, for example acrylic acid. The molecular proportion of the acid component is 0.2 to 24% or preferably 1 to 10%. The molecular weight is in the region of 1000 to 6000, preferably from 3000 to 5000. The acid number is 20 to 100 or preferably 30 to 80.

Other polymers containing carboxyl groups are, for example, ethylene/methacrylic acid and ethylene/ethacrylic acid and similar copolymers, which may be produced by known methods.

The polyamine starting material may be, for example, a compound of formula I, $$R\left[\begin{array}{c}R_1\\|\\N-(CH_2)_n\end{array}\right]_x\!\!\!\!\!\begin{array}{c}R_2\\|\\NH\end{array}$$

in which R signifies a linear or branched, substituted or unsubstituted alkyl or alkenyl radical of 12 to 22 carbon atoms, $R_1$ and $R_2$ each independently signifies a substituted or unsubstituted alkyl radical of 1 to 3 carbon atoms or hydrogen, n signifies the integer 2 or 3 and x signifies an integer from 1 to 4.

Preferred compounds of formula I are those in which R signifies a linear, unsubstituted alkyl or alkenyl radical of 16 to 20 carbon atoms, in particular 18 carbon atoms, and/or $R_1$ and $R_2$ each signifies hydrogen and/or n signifies the integer 3 and/or x signifies the integer 1.

Other preferred starting polyamines are those of formula II, $$R'-CO-NH-(CH_2)_n\!\!\left[\begin{array}{c}R_1\\|\\N-(CH_2)_n\end{array}\right]_y\!\!\!\!\!\begin{array}{c}R_2\\|\\NH\end{array}\quad\text{II}$$

in which $R_1$, $R_2$ and n are as defined above,

R' signifies a linear or branched, substituted or unsubstituted alkyl or alkenyl radical of 11 to 21 carbon atoms and y signifies zero or an integer from 1 to 3.

Preferred compounds of formula II are those in which R' signifies a linear, unsubstituted alkyl or alkenyl radical of 15 to 19 carbon atoms, in particular 17 carbon atoms, and/or $R_1$ and $R_2$ each signifies hydrogen and/or n signifies the integer 2 and/or y signifies an integer from 1 to 3, in particular 1.

When a polyamine of formula II is used, the preferred polymer containing carboxyl groups are those in which the polymer is formed by copolymerization of ethylene and an unsaturated aliphatic carboxylic acid.

Other preferred starting polyamines are those of formula III, $$R''-C\begin{array}{c}\nearrow N-CH_2\\\\ \searrow N-CH_2\\|\\CH_2-CH_2(-N-CH_2-CH_2)_y-NH\\\quad\quad\quad\quad|\quad\quad\quad\quad\quad\quad\quad|\\\quad\quad\quad\quad R_1\quad\quad\quad\quad\quad\quad R_2\end{array}\quad\text{III}$$

in which $R_1$, $R_2$ and y are as defined above, and

R" signifies a linear or branched, unsubstituted or substituted alkyl or alkenyl radical of 11 to 21 carbon atoms.

Preferred compounds of formula III are compounds in which R" signifies a linear, unsubstituted alkyl or alkenyl radical of 15 to 19 carbon atoms, in particular 17 carbon atoms, and/or $R_1$ and $R_2$ each signifies hydrogen and/or y signifies zero.

When a compound of formula III is used, it is preferred to react it with oxidized polyethylene.

As examples of compounds of formulae I, II and III may be mentioned the amines formed by the reduction of adducts of acrylonitrile on fatty amines containing 12 to 22 carbon atoms, the reaction products of fatty acids having 12 to 22 carbon atoms with aminoethyl or aminopropyl derivatives such as diethylene triamine, triethylene tetramine, tetraethylene pentamine, dipropylene triamine, tripropylene tetramine, N-methylimino-bis-propylamine, N-2-hydroxyethyl-ethylene diamine and the imidazoline derivatives formed by cyclization of the reaction products of fatty acids and the named aminoethyl derivatives.

Of the imidazoline compounds, one which merits special mention is 1-aminoethyl-2-alkylimidazoline containing an alkyl or alkenyl radical with 11 to 21, preferably 15 to 19 or particularly 17 carbon atoms.

An aqueous dispersion of a salt of the amide product can be directly prepared, for example, by pouring the melt of the final polymeric amide at about 100°–140° C., with stirring, into hot water containing an acid suitable for salt formation with the polymer. Suitable inorganic acids include phosphoric and hydrochloric acid, and suitable organic acids include formic, acetic, propionic, lactic and oxalic acid. The acid concentration is suitably 1 to 4 equivalents of acid per basic group. Alternatively the acid can be added to the polymer and the melt containing the salt emulsified directly by addition to water at about 95°–98° C. with stirring.

The aqueous dispersion of the salt of the polymeric amide is suitable for the production of wash resistant softening and antistatic finishes on textiles, in particular textiles of wool, natural cellulosic and regenerated cellulosic fibres, polyamide, polyester, polyacrylonitrile, polyolefin and other synthetic fibres, as are described, for example, in "Einfuhrung in die Chemie und Technologie der Kunststoffe", Berlin, 1952.

The dispersions may be applied to textiles by standard finishing methods. For example, the textile substrate can be treated in an exhaust bath containing 0.1 to 20 g/l of a dispersion as disclosed herein, or padded with a liquor containing 1 to 30 g/l of such a dispersion, the application medium being preferably adjusted to the pH region of about 3 to 8. After application by the exhaust method the textiles may be hydro-extracted, or in pad application expressed on the machine, to retain a given percentage of the dispersion and are then conveniently dried at 80 to 160° C.

Dispersions according to this invention can be applied as softening agents in combination with other textile auxiliaries, for example products for resin finishes such as resin-forming N-methylol compounds, for example dimethylol urea, dimethylol propylene urea, dimethylol ethylene urea, hydroxyethylene urea, hydroxypropylene urea etc.

The following Examples illustrate the invention. The parts and percentages are by weight and the temperatures in degrees centigrade.

EXAMPLE 1

200 Parts of an oxidized polyethylene of 0.98 g/cm$^3$ density, acid number 56 and melting point ≈ 140°, are set for reaction at 150° with 70 parts of an N-alkylaminopropylamine whose alkyl or alkenyl radicals comprise about 28% of a C$_{16}$H$_{33}$, 28% of a C$_{18}$H$_{37}$ and 43% of a C$_{18}$H$_{35}$ radical. A current of nitrogen gas is directed into the viscous melt, with stirring and distillation of the water of reaction. After 2 hours the melt is raised to 160° and this temperature is maintained for a further 8 hours. By this time 5 ml of water have distilled and the acid number of the product is 10.6. The spectrum of the reaction product shows the characteristic absorption band of the NH group at 3300 cm$^{-1}$. The carbonyl band at 1725 cm$^{-1}$ is only very slightly in evidence.

A dispersion of the product is prepared by melting 20 parts and adding 3 ml of phosphoric acid with stirring until homogeneously distributed, on which the salt suspension is run with stirring into 40 ml of water at 95°–98°. A dispersion is formed which is allowed to cool with stirring. The dispersion can be diluted with water to the concentration required for application to synthetic fibres as a wash resistant softening agent.

EXAMPLE 2

100 Parts of an oxidized polyethylene, acid number 25, which is obtained by oxidation of a polyethylene of 2000–2500 molecular weight, 0.93 g/cm$^3$ density and melting point 98–100°, are melted at 120° with 20 parts of alkylaminopropylamine of the same composition as in Example 1, with the addition of 150 ml of xylene. After 2 hours at 120° the melt is raised to 150° and after a further 2 hours, to 160°. The water of reaction is azeotropically distilled. At the end of 2 hours, 1.8 ml of water has distilled. After distillation of the xylene the product has the acid number 17.2.

Aqueous dispersions of this product are prepared as described in Example 1, using 2 ml of acetic acid in place of 3 ml of phosphoric acid for formation of the salt.

EXAMPLE 3

The procedure of Example 2 is followed, with the 20 parts of N-alkylaminopropylamine for amidation replaced by 20 parts of 1-aminoethyl-2-stearylimidazoline, which is obtained by the method described in the journal "Fette, Seifen, Anstrichmittel", Vol. 73, page 175 (1971). The condensation reaction is carried out as in Example 2 using 150 ml of xylene to assist distillation of the water. By the end of the reaction, 1 part of water has distilled. The acid number of the product is 16.5.

To prepare a dispersion 10 parts of the product are melted and stirred into 40 ml of 4% aqueous acetic acid at about 95°. The dispersion is allowed to cool with continued stirring.

EXAMPLE 4

The procedure of Example 2 is employed with the 20 parts of N-alkylaminopropylamine replaced by 20 parts of N-stearoyl dipropylene triamine. This is obtained by thermal condensation of 1 mol of stearic acid with 1 mol of dipropylene triamine according to the known method. By the end of the condensation reaction 1 part of water has distilled. The product has the acid number 20. An aqueous dispersion of the product is produced as described in Example 3.

EXAMPLE 5

100 Parts of a copolymer from ethylene and acrylic acid with a density of 0.93 g/cm$^3$, acid number 80, melting point 102° and 650 cp viscosity at 120° are dissolved in xylene. 55.5 Parts of N-alkylaminopropylamine whose alkyl and alkenyl radicals consist to 28% of a C$_{16}$H$_{33}$, to 28% of a C$_{18}$H$_{37}$ and to 43% of a C$_{18}$H$_{35}$ radical are added to the solution at 120°. The temperature is increased to 150° and after 2 hours at this temperature, to 160°, with azeotropic distillation of the water of reaction. After reacting for 2 hours at 160° the xylene and the remaining water are distilled under vacuum. The total volume of distilled water is 0.5 ml and the acid number of the product 44. The spectrum of the product has an absorption band at 1630 cm$^{-1}$ for the NH—CO group.

A dispersion is prepared by melting 10 parts of the product and stirring the melt into 40 ml of 4% aqueous acetic acid solution at 95°, the dispersion being allowed to cool with stirring.

In place of acetic acid, formic, phosphoric, perchloric, hydrochloric or chloracetic acid can be used. With these acids also fine aqueous dispersions of the products are obtained which can be applied to syntheticfibre textiles as wash resistant softening and antistatic agents.

EXAMPLE 6

The procedure of Example 5 is employed, with the 55 parts of N-alkylaminopropylamine replaced by 50 parts of 1-aminoethyl-2-stearyl imidazoline, which is produced by the method given in the journal "Fette, Seifen, Anstrichmittel", Vol. 73, page 175 (1971). The condensation reaction is carried out as described in Example 1. After 1.7 ml of water have distilled the product has the acid number 48.

To prepare a dispersion, 10 parts of the product are melted, 2 parts of acetic acid added and the melt run into water at 95–99° with stirring; the fine dispersion formed is allowed to cool with continued stirring.

EXAMPLE 7

100 Parts of a copolymer from ethylene and acrylic acid with a density of 0.93 g/cm³, acid number 40, melting point 105° and an average molecular weight of 3000 are melted with 20 parts of stearoyl dipropylene triamine, which is produced according to the known method by thermal condensation of 1 mol of stearic acid with 1 mol of dipropylene triamine. Subsequently, 100 ml of xylene are added as a distilling aid. The temperature is increased to 150° and after 2 hours at this temperature to 160°. The melt is held at the latter temperature for 6 hours. By this time 1.5 ml of water has distilled. After vacuum distillation of the xylene the acid number of the product is 5.6. Aqueous dispersions can be prepared as described in Example 2.

EXAMPLE 8

80 Parts of a copolymer from ethylene and acrylic acid, which has a density of 0.93 g/cm³, acid number 40, melting point 100 and a molecular weight of 3000 are reacted as described in Example 7 with 20 parts of an alkylaminopolypropylene polyamine whose alkyl and alkenyl radicals consist to 28% of a $C_{16}H_{33}$, to 28% of a $C_{18}H_{37}$ and to 43% of a $C_{18}H_{35}$ radical. A product with acid number 14.8 is obtained, with which aqueous dispersions can be prepared by the method given in Example 6.

EXAMPLE 9

100 Parts of a copolymer from ethylene and acrylic acid, which has a density of 0.935 g/cm³, acid number 80, melting point 102° and 650 centipoises viscosity at 140° are reacted as in Example 7 with 25 parts of an N-alkylaminopropylamine whose alkyl and alkenyl radicals consist to 28% of a $C_{16}H_{35}$, to 28% of a $C_{18}H_{37}$ and to 43% of a $C_{18}H_{35}$ radical. A product is obtained which after condensation has an acid number of 32 and is dispersible in water as described in Example 6.

EXAMPLE 10

Polyamide 6 yarn is entered into a water bath set with 3 g/l of an aqueous dispersion of the acetate salt of the product obtained as described in Example 7. It is treated for 30 minutes at 70° and liquor ratio 30:1 with constant agitation, and on removal is dried for 10 minutes at 120°. The yarn has a soft handle.

What is claimed is:

1. A polymeric basic amide produced by reacting at a temperature above 100° C. (1) a polymer containing carboxyl groups and selected from the group consisting of oxidized polyethylene having a molecular weight from 700 to 7000 and an acid number from 10 to 120 and copolymers formed by copolymerizing ethylene and an unsaturated aliphatic carboxylic acid of 3 to 8 carbon atoms, which copolymers have a molecular weight of from 1000 to 6000, an acid number of 20 to 100 and a molecular proportion of acid component in the range 0.2 to 24% with (2) a polyamine of the formula,

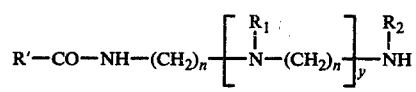

in which $R_1$ and $R_2$ are each, independently, hydrogen or unsubstituted alkyl of 1 to 3 carbon atoms,
R′ is a linear or branched unsubstituted alkyl or alkenyl radical of 11 to 21 carbon atoms,
n is an integer 2 or 3 and
y is an integer from 1 to 3.

2. A polymeric amide according to claim 1 wherein the polymer containing carboxyl groups is a copolymer of ethylene and an α-, β-unsaturated carboxylic acid.

3. A polymeric amide according to claim 2 wherein the carboxylic acid is selected from the group consisting of acrylic acid, methacrylic acid and ethacrylic acid.

4. A polymeric amide according to claim 3 wherein the carboxylic acid is acrylic acid.

5. A polymeric amide according to claim 1 wherein $R_1$ and $R_2$ are hydrogen and y is an integer of 1 to 3.

6. A polymeric amide according to claim 1, in which the oxidized polyethylene is of molecular weight from 1500 to 4000 and has an acid number from 15 to 80 and the copolymer is one of ethylene and an α, β-unsaturated carboxylic acid of 3 to 8 carbon atoms, with a molecular weight of from 3000 to 5000 and an acid number of from 30 to 80.

7. A polymeric amide according to claim 1, in which in the polyamine of formula II, R′ signifies a linear unsubstituted alkyl or alkenyl radical of 15 to 19 carbon atoms, $R_1$ and $R_2$ each signifies hydrogen, n signifies the integer 2 and y signifies an integer from 1 to 3.

8. A polymeric amide according to claim 1, in which the reaction is carried out at 160 to 190° C.

9. A polymeric amide according to claim 1, in which the polyamine is employed at a ratio of 1 to 1.4 mols per carboxyl group of the polymer.

10. A polymeric amide according to claim 1, produced by reacting a copolymer from ethylene and acrylic acid, with a density of 0.93 g/cm³, acid number 40, melting point 105° C. and an average molecular weight of 3000 with stearoyl dipropylene triamine.

* * * * *